M. T. HANCOCK, Jr.
CLUTCH PEDAL AND THROTTLE CONTROL FOR AUTOMOBILES.
APPLICATION FILED AUG. 4, 1911.
1,050,826.
Patented Jan. 21, 1913.
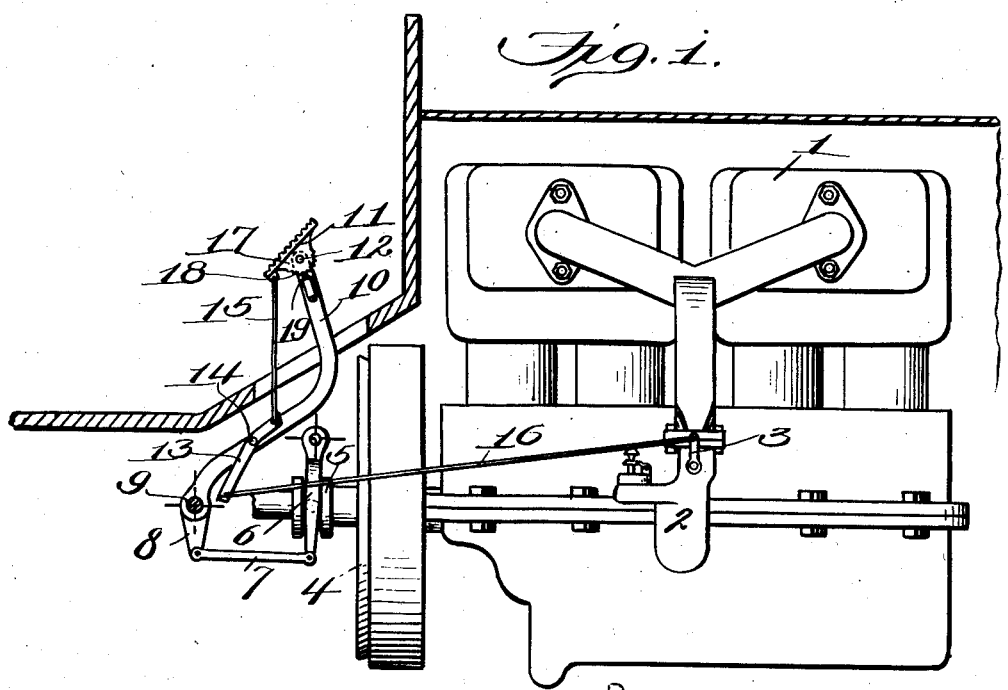
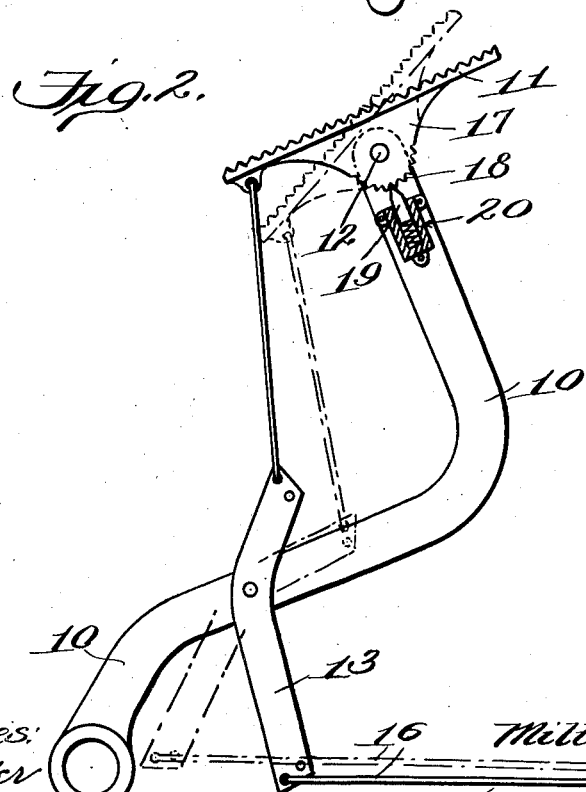

UNITED STATES PATENT OFFICE.

MILTON T. HANCOCK, JR., OF LOS ANGELES, CALIFORNIA.

CLUTCH-PEDAL AND THROTTLE CONTROL FOR AUTOMOBILES.

1,050,826.

Specification of Letters Patent. Patented Jan. 21, 1913.

Application filed August 4, 1911. Serial No. 642,369.

*To all whom it may concern:*

Be it known that I, MILTON T. HANCOCK, Jr., citizen of the United States, residing at Los Angeles, in the county of Los Angeles and State of California, have invented new and useful Improvements in Clutch-Pedal and Throttle Control for Automobiles, of which the following is a specification.

My present invention relates to improvements in control devices for automobiles or motor vehicles and more particularly to those of the class employing internal combustion motors and changeable gear transmissions, and the primary object of the invention is to facilitate and insure safety and ease in the operation of automobiles or motor vehicles of this class by combining a throttle control with the clutch pedal, these two controlling means being so combined or related that they are under the direct and immediate command of the operator, and in the preferred embodiment of the invention, the clutch pedal and the throttle controlling mechanism are both connected operatively to a single or common actuating member which is actuated by one foot of the operator.

The improvement provided by the present invention enables the throttle of the engine to be closed prior to or during the release or disengagement of the clutch and also enables the throttle to be opened during or subsequent to the engagement of the clutch and while the clutch is engaged, the throttle may be adjusted to suit varying conditions by the same foot of the operator which serves to manipulate the clutch pedal, the motor vehicle being hence under better control of the operator and the objections incident to manipulation of the hand throttle controls of the steering column, are avoided.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a diagrammatic view of a portion of an automobile equipped with a combined pedal and throttle control constructed in accordance with the preferred embodiment of the invention; and Fig. 2 is a detail view of the clutch pedal showing the throttle control combined therewith.

Similar parts are designated by the same reference characters in the several views.

In the present instance, 1 designates the engine or motor which is of the internal combustion type and having any suitable form of carbureter 2 provided as usual with a throttle 3, adjustment of which serves to vary the speed and power of the motor or engine.

4 represents conventionally the clutch which serves to connect and disconnect the engine with respect to the running gear of the vehicle, it being customary to employ changeable speed transmission gearing between the engine and the running gear of the vehicle to obtain the desired speeds and to enable the different changes to be made in the transmission gear, the clutch is released or disengaged prior to the change in the transmission gearing and is re-engaged after the change has been made.

The present invention is applicable generally to automobiles and motor vehicles, irrespective of the particular types of clutch mechanism or transmission. In the present instance, the clutch is operated by a clutch collar 5 with which a clutch shifting fork 6 coöperates, this clutch shifting fork being connected by a link 7 to an arm 8 fixed to a transverse rock shaft 9 and a clutch pedal 10 is fixed to the rock shaft. A movable or adjustably mounted actuating member 11 is provided which, according to the present invention, serves to operate the clutch pedal and also the throttle controlling mechanism. Preferably, this actuating member is in the form of a foot plate, as shown, and it is pivotally mounted at 12 on the upper end of the clutch pedal 10 so that pressure upon the foot plate will actuate the clutch pedal and a rocking or tilting of the foot plate will serve to adjust the throttle. In the present instance, the clutch pedal is so connected to the clutch that depression of the pedal will release or disengage the clutch, and a rising of the pedal which is usually effected by a spring will serve to reëngage the clutch. The invention, however, is not limited to this specific kind of clutch mechanism. The throttle control in the present instance comprises a lever 13 which is pivoted on the clutch pedal at 14 and is connected to the tiltable foot plate 1 by a link 15 and to the throttle 3 by a link 16. The lever 13 is so mounted and shaped that normally the lower end of the lever which is connected by the link 16 to the throttle will occupy a position in immediate proximity to the rock shaft 9 about which the clutch pedal swings so that operation of the clutch pedal will not disturb the adjustment of the carbureter. However, the throttle may be adjusted irrespective of the position occupied by the clutch pedal. In order to retain different adjustments for the carbureter or throttle, one of the ears 17 by which the foot plate is pivoted to the clutch pedal is preferably provided with a concentric row of teeth 18 which coöperate with a spring-pressed plunger 19, the latter being guided and supported on the clutch pedal by a housing 20 of suitable construction. The plunger 19 will serve to yieldably hold the foot plate in different adjusted positions, but sufficient pressure on the foot plate will readjust it.

In Fig. 2, the normal position occupied by the throttle controlling mechanism is shown by dotted lines, while the full lines indicate the position occupied by this mechanism when the foot plate is tilted to open the throttle. By combining the throttle controlling mechanism with the clutch pedal, the power of the engine or motor and the transmission of such power to the propelling wheels of the vehicle may be controlled by the operator with the greatest facility and certainty, undesirable speeding of the engine when the load thereon is relieved by disengaging the clutch and stalling of the motor by engaging the clutch while the motor is developing insufficient power, are avoided. Moreover, the present invention enables the hand throttle control on the steering column to be dispensed with, the hand control being objectionable in that it requires the operator to remove the hand from the steering wheel, a practice which is both dangerous and inconvenient. However, if preferred, the throttle control of the present invention may be used as an accelerator or as an auxiliary to the usual hand throttle control.

I claim as my invention:—

1. In a motor vehicle, the combination of a clutch controlling member, throttle controlling means, and a common actuating device movably connected to said member and connected to said throttle controlling means and operative to control said clutch and throttle individually or simultaneously at the will of the operator.

2. In a motor vehicle, the combination of a clutch controlling pedal, throttle controlling means, and a common operating member movably mounted on said pedal and connected to the throttle controlling means and operative to actuate either said pedal or the throttle controlling means at the will of the operator.

3. In a motor vehicle, the combination of a clutch controlling pedal, throttle controlling means, and a member permanently but movably connected to the pedal and said means and operative to adjust the throttle controlling means individually or simultaneously with respect to the operation of the clutch pedal.

4. In a motor vehicle, the combination of an internal combustion engine for propelling the same, a driving clutch coöperative with said engine, throttle-controlling means for the engine, a foot plate movably mounted on the clutch-controlling pedal and operatively connected to the throttle-controlling means, and means for holding said foot plate yieldably in different positions relatively to the pedal to retain the throttle-controlling means at different adjustments.

5. In a motor vehicle, the combination of a clutch pedal, throttle controlling means, and a combined throttle and pedal operating foot plate movably mounted on said pedal and operatively connected to said throttle controlling means.

6. In a motor vehicle, the combination of a clutch controlling pedal, throttle controlling means operatively associated therewith, a foot plate pivotally connected to said pedal for actuating the latter and operatively connected to the throttle controlling means for adjusting such means, and a device for holding said foot plate in different adjusted positions.

7. In a motor vehicle, the combination of a motor for driving the same, a clutch driven by the motor and controlling the driving of the vehicle, a throttle controlling the operation of the motor, a clutch controlling member, and a device movably mounted on the clutch controlling member and connected to said throttle, said device constituting common operating means for the clutch controlling member and the throttle and being operative to control the same individually or simultaneously.

In testimony whereof I have hereunto set my hand in presence of two subscribing witnesses.

MILTON T. HANCOCK, Jr.

Witnesses:
 B. R. HANNAFORD,
 A. L. HOLMES.